United States Patent [19]

Luxemburg

[11] 4,451,377
[45] May 29, 1984

[54] PROCESS FOR CLEANING AN OIL-CONTAMINATED BRINE CONTAINING PARTICULATE DRILL CUTTING SOLIDS

[76] Inventor: S. Roy Luxemburg, 10530-424 Florida Blvd., Baton Rouge, La. 70815

[21] Appl. No.: 346,202

[22] Filed: Feb. 5, 1982

[51] Int. Cl.$^3$ ............................................. B01D 21/01
[52] U.S. Cl. ..................................... 210/708; 134/40; 175/66; 210/728; 210/730; 210/734; 210/778
[58] Field of Search ..................... 208/8 R; 134/7, 40; 166/267; 175/66; 210/708, 712, 725, 727, 728, 730–734, 777, 778

[56] References Cited

U.S. PATENT DOCUMENTS

| 3,080,971 | 3/1963 | Hutto et al. | 210/778 |
| 3,433,312 | 3/1969 | Burdyn et al. | 175/66 |
| 3,493,499 | 2/1970 | Zeitoun et al. | 210/727 |
| 3,637,031 | 1/1972 | Hull et al. | 175/66 |
| 3,716,480 | 2/1973 | Finley et al. | 210/202 |
| 3,737,037 | 6/1973 | Bone | 175/66 |
| 4,127,482 | 11/1978 | Watson et al. | 210/727 |
| 4,174,278 | 11/1979 | Tramier et al. | 210/728 |
| 4,238,330 | 12/1980 | Fong et al. | 210/708 |
| 4,242,146 | 12/1980 | Kelly, Jr. | 134/40 |
| 4,353,803 | 10/1982 | Dover, Jr. | 210/728 |

FOREIGN PATENT DOCUMENTS 53-26452 11/1978 Japan .................................. 210/732

Primary Examiner—Peter A. Hruskoci
Attorney, Agent, or Firm—Llewellyn A. Proctor

[57] ABSTRACT

A process for cleaning oil-contaminated well bore fluids, and particulate solids. An oil-contaminated well bore fluid, or particulate solids, or both, is admixed with an aqueous polymeric solution and diatomaceous earth, and the admixture filtered to free the oil-contaminated well bore fluid, or solids, of oil which is separated therefrom. The oil-decontaminated well bore fluid is thereby rendered suitable for reuse, and residual solids useful for reblending with the original well bore fluid, or rendered environmentally acceptable for discharge.

6 Claims, No Drawings

PROCESS FOR CLEANING AN OIL-CONTAMINATED BRINE CONTAINING PARTICULATE DRILL CUTTING SOLIDS

BACKGROUND OF THE INVENTION

1. Field of the Invention

This invention relates to a process for the cleaning of oil from well bore fluids, oil contaminated drilling fluids, or muds, production water, completion fluids, packer fluids, brines and the like, as well as the cleaning of oil contaminated residual solids, notably drill cuttings, and the isolation and recovery of the separated oil from such fluids, or residual solids.

2. Description of the Prior Art and Problems

In rotary drilling, as practiced in oil and gas exploration, a well bore is formed which extends downwardly from the earths surface to an oil or gas producing stratum. Formation of the well bore requires cutting into the earth with a rotating bit attached to the end of a drill string formed from joints of pipe sequentially attached as the well bore is extended downwardly. Various fluids are employed in well bore formations, completions and workover operations. Exemplary of these are (1) drilling fluids, or "muds", which are clay-based, and (2) brines which are clay-free, clear heavy fluids often used for well completions.

In drilling the well bore, a clay-based drilling fluid, or mud, constituted generally of a mixture of weighting materials, clays, chemicals and water or oil, is pumped down through the drill string as the well is drilled to exit through jets in the drill bit at the bottom of the hole, the mud ascending to the surface via an annular space between the exterior wall of the drill string and the wall of the hole, or well bore, which may be walled with well casing. At the surface, the mud is pumped to a shale shaker equipped with one or more layers of vibrating screens of one to three, or more mesh sizes for cuttings removal. The mud is then returned to a mud pit, or temporarily stored in a sump pit. This type of clay-based drilling fluid, or mud, serves several essential functions, the most important of which is to (1) control subsurface pressures and maintain stability, (2) cool and lubricate the drilling tool or bit, (3) suspend and transport all movable solids (drill cuttings) to the surface, (4) provide rheologically-stable flow or circulation for the purposes characterized in (2) and (3), supra, and (5) provide a chemically stable or compatible chemical environment to the well bore to minimize or eliminate corrosion of the drill string and casing as well as compatible environment to the formations encountered in order to seal off permeable formations of oil, gas or water as the well is drilled through different subterranean formations and strata. In the event of a shutdown in the drilling operation, the purpose of the mud is to hold the cuttings, sand and other solids particulates, or residual solids materials in suspension within the column of drilling fluid while efforts are being made to maintain or restore circulation of the drilling fluid.

Saturated brines are used as packer fluids when suitably viscosified, and more often as well-completion fluids. These are aqueous solutions of salts, often alkali or alkaline-earth metal salts, e.g. $CaCl_2$, $CaBr_2$, $NaCl$, or the like; or various other salts, e.g. $NaBr_2$, $ZnBr_2$ or the like, as well as admixtures of these and other salts such as $CaBr_2/ZnBr_2$, $NaBr_2/NaCl_2$ $CaCl_2/CaBr_2/ZnBr_2$, of density ranging from about 8.3 to 18 lb/gallon. Brines are commonly used to swab and clean out a well after the well is drilled, the casing set, and production tubing run. Typically a bit and scraper run is made to clean the well while the drilling mud is yet in place, the debris falling into the mud this being done to avoid contamination of the higher prices brines. The drilling mud is then displaced by the brine, and the well bore then swabbed out and cleaned therewith.

Oil contamination presents pressing problems. It is often desired, e.g., to add diesel fuel to mud, typically in 1 to 5 percent by volume, for torque reduction, or viscous drag reduction on the drill string to suppress or prevent sticking of the drill string. This practice, once common, is not now often used despite such advantages because of the oil-contamination problem. In any event, after service the drilling fluids, or muds, or the solids residual portions thereof, are often highly contaminated with oil as well as residual solids. Brines, sooner or later, are sufficiently contaminated with oil and solids that they are unfit for further use. "Preferential-wetting" of the solids by oil is often encountered. The cuttings themselves, when the mud is brought to the surface and the cuttings separated therefrom, are therefore effectively soaked and coated with the oil, or oil base muds when such are used. This entails a significant disposal problem since the cuttings cannot be simply dumped because of oil pollution problems. Residual mud solids recovered from the mud pit may likewise be highly oil-contaminated, and this too presents a disposal problem; as well as one where significant economies are involved due to the desire, or need to recover the oil, and various components of the mud for reuse. It is quite essential to decontaminate and, if possible, recover the oil from the brine, a very expensive commodity in oil and gas producing operations. Oil must also be separated from subterranean water from the well, and such production water decontaminated prior to its disposal. There is thus a pressing need for the oil-decontamination of well bore fluids, and solids.

It is, accordingly, the primary objective of the present invention to provide a novel process for meeting this need, or more specifically to provide a process for the demulsification, separation, and cleaning of oil from well bore fluids, and from particulate solids contaminated with oil.

A more specific object is to provide a novel process for the demulsification, separation, and removal of oil from drilling fluids, or muds, production water, completion fluids, packer fluids, brines and the like, as well as the separation, and removal of oil from slurries, or residual solids, notably drill cuttings.

These objects and others are achieved in accordance with the present invention, a process wherein an aqueous solution of a water soluble polymer is admixed with an oil contaminated well bore fluid, or particulate solids, and the well bore fluid, or solids, then freed of oil which is separated from the well bore fluid, or solids. The oil-decontaminated well bore fluid is thereby rendered suitable for reuse, and residual solids useful for reblending with the original well bore fluid, or rendered environmentally acceptable for discharge.

The present invention is particularly useful for cleaning oil-contaminated drilling fluid particulates, or drill cuttings recovered from drilling fluids, or muds, and for cleaning oil-contaminated brines. In treating the former type of materials, the oil-contaminated drill cuttings are first recovered from the drilling fluid, or mud, which is continuously circulated from the well back to the settling pit. The drilling mud removes the oil-contaminated drill solids particles, or cuttings from the bottom of the well bore, and they are carried within the well bore outside the drill string to the surface where the oil-contaminated particles, typically larger than 200 mesh size (American Standard series), are removed at the shale shaker located upstream of the settling pit. The shale shaker is particularly useful when drilling muds are used, since the cuttings are typically larger than the 200 mesh size. Solids smaller than 200 mesh size are dropped through the shale shaker screens and returned to the mud pit which supplies drilling fluid for the well bore. Drill cuttings smaller than 200 mesh are unavoidably passed through the screens as well. When the muds containing these and other solids are displaced by a subsequent completion or workover operation, the solids, including those which are smaller than 200 mesh are, typically, flocculated by the process of this invention after oil-stripping which prepares the particles for diatomaceous earth filtration.

The oil-contaminated solids from the shaker are admixed with diatomaceous earth and said polymeric solution, at least the major portion of the solids particles settling to the bottom of the aqueous liquid as masses freed of oil, these oil-decontaminated solids being readily separated from the aqueous liquid by flocculation, decantation or filtration, preferably by flocculation or decantation. The oil-decontaminated solids are readily disposed of, usually at the on-shore or off-shore drilling site.

The oil-contaminated brine, after removal from the well bore, is admixed with an aqueous solution of the polymer and the admixture filtered. The aqueous liquid, including the oil, passes through the filter, the oil separating from the brine and floating on the surface of the brine after passage through the filter. It is surprising that essentially all of the oil passes through the filter mass since the materials of which most filters are constructed, i.e. wound or woven materials of polypropylene, polymers of Dacron, terlene, rayon and its homologs or any material, synthetic or natural, which possesses a very high surface-to-volume ratio such as wound spools of non-woven thread or interwoven screens of the aforementioned materials, are known to be highly adsorptive. The aforementioned and other materials, e.g. stainless steel, form a structure of wound spools or interwoven screens supported upon metallic or plastic structures where diatomaceous earth may be used as a filtering aid to precoat such spools or screens, thereby providing even larger surface area of myriad pores or micropores ranging from the infinitesmal to perhaps 5 microns. It is known that diatomaceous earth is particularly highly oil adsorptive, typically capable of adsorbing two and one-half times its own weight. Precoat materials such as Vermiculites, cellites, dicalites and their homologues as marketed world-wide by the Dicalite Division of General Refractories Company are also highly adsorptive and approximately to the same extent as the diatomaceous earth. The brine, in any event, after passage through the filter, will contain minimal amounts of suspended solids, generally of average diameter below one micron. The rate of filtering is extremely fast, the rate often being 500 percent or higher by volume than that obtained by conventional processing in existing equipment, which permits essentially no oil to be retained within the brine. Further, existing methods require much greater effort filter the fine solids of the brine which are often below 5 microns, average particle size diameter. A feature of this invention is that little or no oil is retained on the filter cake which can be readily disposed of after use by dumping in an environment-sound manner, since there is no oil contaminant, and the polymers are biodegradable. Production waters and other fluids can be similarly treated for oil-decontamination, cleaned, and the oil separated and recovered.

Polymers useful in the practice of this invention are: (1) water-soluble polyacrylamides, particularly the more highly anionic species, which are preferred. Exemplary of the polyacrylamides are the "poly flocs" or "Separans" marketed by Dow Chemical Company under the formulas Dowell M-144, Dowell M-172, Dowell M-173, the "Cyflocs" marketed by American Cyanamid as formulas 4000, 4010, 4020 and 4500, and the "Hercoflocs" marketed by Hercules Chemical Company; of which the more highly anionic compositions are preferred, e.g., Dow's Dowell M-144 or American Cyanamid's Cyfloc 4000; (2) water-soluble poly (acrylic acid) and its homologues, e.g. poly (methacrylic acid), their salts, and copolymers of acrylic acid and methacrylic acid with their hydrophobic or hydrophilic comonomers; (3) water-soluble poly (ethylene oxide) resins, exemplary of which are those sold commercially by Union Carbide Corporation under the Polyox trademark, e.g. Polyox 301, WSR-N-80, WSR-N-750 and the like, or as produced by Meisei Chemical Works Lts. sold under the trademark Alkox, or by Seitetsu Kagaku Co., Ltd. under the trademark PEO: (4) polyvinyl alcohol, the only linear polyhydroxy polymer which is readily water soluble, exemplary of which is Elvanol, a trademark product sold by DuPont Chemical Co.; (5) water-soluble carboxymethylcellulose, exemplary of which is sodium carboxymethylcellulose, hydroxyethylcellulose, hydroxypropylcellulose, hydroxypropylmethylcellulose and admixtures thereof which are produced worldwide by numerous industrial concerns under various trademarks, viz. CMC-T by Hercules Inc., Edifas B by Imperial Chemicals Industries, Ltd., Methocel by Dow Chemical Company, etc.; (6) soluble gums known as carrageenans which occur in certain species of red seaweeds of the Gigartinaceae, Solieriaceae, Phyllophoraceae, and Hypneaceae families. Chemically these are sulfated linear polysaccharides of D-galactose and 3,6-anhydro-D-galactose and, by virtue of the half-ester sulfate groups are polyelectrolytes; and (7) guar gum, a readily water-soluble carbohydrate polymer constituted as a chain of Beta-D-mannopyranosyl units linked (1→4) with single-membered Alpha-D-galactopyranosyl units occurring as side branches; the Alpha-D-galactopyranosyl units being linked (1→6) with the main chain.

The polymer is dissolved in water, or aqueous solutions, in concentration sufficient that the solution when admixed with the diatomaceous earth and oil-contaminated well bore fluid, or particulate solids, will produce demulsification of the oil. Suitably, from about 500 parts of polymer, per million parts by weight of the water (ppm), to about 3 percent of the polymer, based on the weight of the polymer and water, and preferably from about 0.05 percent to about 1 percent of polymer is added to the water to form the solution. The polymeric solution, oil-contaminated well bore fluid, or particulate solids, and diatomaceous earth are then added one to the other and admixed. In admixing the polymeric solution and diatomaceous earth, preferably sufficient of the polymeric solution is added to form discrete liquid phase within which the diatomaceous earth and particulate solids are dispersed. Suitably from about 0.1 percent to about 2 percent, preferably from about 1 percent to about 2 percent, or the solution is incorporated with the diatomaceous earth, based on the total weight of the solution and diatomaceous earth. Suitably also, from about 0.1 percent to about 5 percent, preferably from about 0.5 percent to about 2 percent, of the solution is dispersed with the oil-contaminated well bore fluid, or particulate solids, based on the volume of the total solution and oil-contaminated well bore fluid, or particulate solids.

The diatomaceous earths useful in the practice of this invention are, as a class, well known and are commonly used, and referred to as filtering aids. Diatomite, or kieselguhr, a hydrous form of silica or opal composed of the siliceous shells of diatoms, which are unicelled aquatic plants of microscopic size, has long been used as a filtering aid, and is particularly useful in the practice of this invention. Other useful materials are, e.g., bone char, Vermiculite, charcoal, Fuller's earth, acid-treated clays, bauxite, activated alumina, silica gel, asbestos, sawdust, and the like. Decolorizing carbons and earths, such as commercially known Darco, Carbrox, Suchar, Norit, Filtrol, Palex, and activated clays which are oil adsorbent materials are rendered non-adsorbent and are therefore particularly useful in the practice of this invention.

The polymeric solution, oil-contaminated well bore fluid, or particulate solids, and diatomaceous earth are, in a preliminary step, preferably thoroughly admixed, suitably by the turbulent action of a mixer, e.g. a stirrer or other type of mechanical agitator, at ambient temperatures, or temperatures ranging from about 5° C. to about 40° C., preferably at temperatures ranging from about 15° C. to about 30° C., to wash, leach out, and demulsify the oil. The liquid, which now contains the oil, may then be decanted and separated from the decontaminated solids, where emphasis is on the decontamination of oil-contaminated solids, or, the liquid may be filtered and separated from the oil-decontaminated solids. Where emphasis is on the decontamination of oil-contaminated well bore fluids, on the other hand, the liquid is filtered, and cleaned of solids by separation therefrom. Oil is generally recovered as a discrete phase which floats on top of the liquid after passage through the filter. The action of the polymers upon the solids enables the oil to pass through filters which are known to be highly oil-adsorbent. This constitutes a unique feature of this invention.

Various types of filter, and virtually any type of filter can be used in the separation, and removal of oil from the admixture of the polymeric solution, diatomaceous earth and well bore fluid, or particulate solids, viz. gravity filter, pressure filters, or vacuum filters, this including intermittent vacuum filters and continuous vacuum filters; this being a classification of filters according to the nature of the driving force that causes filtration. Or, if described in terms of their mechanical characteristics useful filters are those which can be termed plate-and-frame filters, leaf filters, rotary drum filters, top feed filters, disc-type filters, sand bed filters and precoat filters. Leaf filters have proven particularly effective in the practice of this invention, the leafs supporting the filter medium through which the pre-mixed polymeric solution, diatomaceous earth, and the various oil-contaminated well bore fluids have been passed, with the aid of a vacuum, pressure, or gravity driving force, to produce separation, and recovery of the oil in the liquid phase after passing through the filter, as well as the cleaning, and decontamination of the various well bore fluids. The oil is also cleaned of solids often to the extent of the removal of the color bodies in the oil, this suggesting a use for this process in the washing and filtration of oil emulsions.

In the filtration of these various oil-contaminated well bore fluids by such apparatus, it has been found through the practice of this invention that the oil is separated from the various well bore fluids, the demulsified oil floating as an immiscible stratum on the surface of the water downstream of the filter where it is readily drawn off and recovered. Solids contained in the well bore fluid are dispersed to the bottom or to the top of the pool of water depending on its specific gravity, generally as low mass clumps or flocs which agglomerate as fluffy, feather-like masses. The solids are oil-free and can readily be disposed of without risk of contaminating the environment. Solids, if any, preferentially wetted by oil will float to the surface of the liquid, the oil and solids being readily separated one from the other by centrifugation or by filtration. Surprisingly, the oil "rides through" the filter, essentially no oil remaining on the filter cake which can also be discharged without risk of contamination of the environment. It has been found advantageous to mount a stirred tank and filter press in series on a vehicle, e.g. a truck, barge or boat, measured amounts of the polymeric solution, well bore fluid and diatomaceous earth being charged into, and admixed within the stirred tank, the admixture then being charged into the filter press for separation of the cleaned well bore fluid, recovery of the high-value fluid, and as well any oil that is found.

The process of this invention, and its principle of operation, will be more fully understood by reference to the following non-limiting examples, and data.

EXAMPLE 1

A 17,000 gallon quantity of a used, dirty, dark-in-color, aqueous $CaBr_2CaCl_2$ solution obtained from a Venice, La. well, having a specific gravity of 13.8 pounds/gallon, containing 0.41 wt. % oil, and 6 wt. % solids, mostly bentonite and montmorillonite, was admixed with 170 gallons of an aqueous solution, containing from 5 to 10 parts by weight of Dowell M-144 (a highly anionic polyacrylamide) per 1000 parts by weight of water, in a large tank on which was mounted a mechanical stirrer.

A portion of the admixture was thoroughly agitated with diatomaceous earth which was added thereto, this having been accomplished while stirring with the mechanical stirrer, rotated at 400 rpm for a period of 20 to 25 minutes. The admixture was then filtered by passage through an 86 square foot horizontal tank, vertical leaf, pressure filter at pressures up to 70 psi, the filter passing 150 gallons/minute of the admixture through a two inch diameter line downstream of the filter. The filtrate was pumped from the two inch line into a clean tank.

It was found on examination, that all of the oil passed through the filter, the oil floating downstream of the filter atop a clear, transparent brine. The oil layer, which suppressed the normal hydroscopicity of the brine, was readily removable from the clear brine as by decantation. The diatomaceous earth obtained from the filter was found to contain no oil. Moreover, the brine is cleaned, regenerated and ready for reuse in a well.

EXAMPLE 2

Four ounces of a "Louisiana gumbo" clay from a Venice, La. well was admixed with an equal weight of an oil-base, or asphaltic material known as "Black Magic", with spatulas on a glass slide. The admixture was then admixed in a glass beaker with 16 ounces of water, which contained 2.5 wt. % NaCl, and 0.15 ounces of a 1 volume % solution of Dowell M-144 in water.

The admixture was then vigorously agitated by use of a magnetic stirrer. The solution was then permitted to settle. Upon settling, the admixture separated in a very clear, transparent solution atop which floated a layer of oil, essentially devoid of color bodies. At the bottom of the beaker was found a thin layer of barytes ($BaCO_3$), characterized as a dark brown powder. Near the bottom of the beaker also, just above the barytes, was found feather-like clumps and masses of particulates.

The Dowell M-144 solution broke up the gumbo, showing clearly that is was capable of "busting up", and cleaning the worst of drill cuttings. The oil, floating at the top of the liquid exhibited good flourescence in U.V. light, solids separated from the filter, and beaker in contrast showed no flourescence in U.V. light. These data clearly show that the solids are clean of oil and can be readily disposed of after treatment in a cuttings washer tank without environmental problems in accordance with the process of this invention.

A feature of this invention is that diesel fuel, "Black Magic" and similar lubricants can again be more widely used in drilling operations to increase the efficiency and speed of drilling, to suppress torque reduction, viscous drag reduction, and drill pipe sticking which can result in circulation loss and possible "fishing" operations. This can be done without waste of drilling fluids due to oil-contamination; since the drilling fluids and solids can be readily cleaned of oil and solids by the process of this invention.

EXAMPLE 3

A 450 mL. quantity of $CaBr_3/CaCl_2$ brine solution having a specific gravity of 13.8 pounds/gallon containing 6 wt. % solids and 0.41 wt. % oil was stirred with a spatula and placed without treatment into a Baroid filter press containing a standard Baroid filter paper (0.5 micron pore rating) which is placed across a stainless steel screen laid interiorly across the bottom of the press container. A 150 psi pressure was then applied to the surface of the solution as a driving force. After one and one-half hours only 30 mL. of the aqueous liquid had passed through the filter. At this time the filter was disassembled and the remaining unfiltered brine solution was poured into a beaker for later use. The filter paper with its filter cake was removed and placed aside for later comparison as was the 30 mL. quantity of filtered, untreated brine.

To the unfiltered remainder of the unfiltered brine previously place in the beaker was added ≡to 6 ml of a solution of 0.05 wt. % of Dowell M-144 in water. The resulting admixture was then vigorously stirred on a magnetic stirrer, then poured under ambient conditions into the Baroid filter press which had been previously cleaned and re-equiped with a standard Baroid filter paper. The Baroid paper was taken from the same package and placed fresh across the same stainless steel screen as before. A 150 psi pressure was then applied to the surface of the brine. In contrast to the previous one and one-half hours required to filter 30 ml. of the brine, the entire contents of the press, 426 mL, had passed through the filter in less than 30 minutes.

It was observed that the oil had floated to the surface of the newly filtered 426 mL. now contained in a clean beaker placed under the filter press. The filter paper was removed from the press. Filter cake was then carefully taken from the paper and placed in a 100 ml. beaker of water. The same was done for the filter cake previously obtained from the untreated brine. Both filter cake and water solutions were stirred briefly with a spatula and it was observed that a thin filmy "slick" appeared on the surface of the filter cake/water solution taken first from the filtration of the untreated brine. No "slick" was observed on the surface of the filter cake and water solution taken from the filtration of the polymer treated brine. This result was further verified when the surfaces of both 100 ml. beakers were illuminated by ultraviolet light. Flourescence was observed on the surface of the small beaker containing the "slick." No flourescence was observed on the surface of the small beaker containing the solution of filter cake and water which exhibited no "slick."

Interestingly, the same ultraviolet lamp was used to observe that no fluorescence occurred when the 30 ml. of filtered brine was illuminated, while the surface of the 426 mL. admixture of brine and polymer solution flouresced brightly.

Both the untreated and treated filtrates were then tested for clarity and color by means of observation of each sample of filtered brine in the cell of a transmissiometer (Hach Chemical Co., Loveland, Colo.) The treated brine exhibited more than 12% (percent) higher transmissivity than did the untreated brine.

These data also showed that the polymer treated filtrate contained solids of ≦2 microns in diameter, which means that the reused brine will not stop up, or block passages within a well in which it is used. Particles of greater size have been found to block passages within a well, and slow up the flow. It is clear too from the data that the polymeric treatment of brines besides removing oil, and solids, increases the filtering rate by at least 500 percent.

Repetition of the foregoing examples using Hercofloc 1018 1021, 1027, 1031 and Cyfloc 4300 show that these polymers are also satisfactory for stripping oil from solids, or drill cuttings, as exemplified in the treatment of a Louisiana gumbo.

It is apparent that various changes, as in temperature, pressure, or the like can be made without departing the spirit and scope of the invention as will be apparent to those skilled in this art.

Having described the invention, what is claimed is:

1. A process for cleaning an oil-contaminated brine containing particulate drill cutting solids, said brine being selected from the group consisting of completion fluids and packer fluids which comprises admixing together said oil-contaminated brine, and an aqueous solution containing a sufficient amount of a water soluble polymer selected from the group consisting of polyacrylamides, poly (acrylic acid), poly (ethylene oxide) resins, polyvinyl alcohol, carboxymethylcellulose, carrageenan gums, and guar gums, and a filter aid capable of forming an oil-free filtercake containing said particulate drill cutting solids, to demulsify the oil of said brine, and filtering said particulate drill cutting solids from the admixture and forming said oil-free filtercake while passing the oil through the filter with the brine, separating the oil and brine into a floating oil layer and a lower clear oil-free brine, and then removing said oil layer from said brine.

2. The process of claim 1 wherein the water soluble polymer is contained in the aqueous solution in concentration ranging from about 500 ppm to about 3 percent, based on the weight of the aqueous solution.

3. The process of claim 2 wherein the concentration of the polymer ranges from about 0.05 percent to about 1 percent.

4. The process of claim 1 wherein the polymer is a polyacrylamide.

5. The process of claim 1 wherein the filter aid is selected from the group consisting of diatomaceous earth, bone char, charcoal, Fuller's earth, acid-treated clays, Vermiculite, bauxite, activated alumina, silica gel, asbestos, and sawdust.

6. The process of claim 1 wherein a pressure or vacuum driven screen is used in the filtering step.

* * * * *